United States Patent Office 3,278,591
Patented Oct. 11, 1966

3,278,591
PROCESS FOR THE PRODUCTION OF A MIXTURE OF TRICHLOROBENZOIC ACID ISOMERS FROM A BY-PRODUCT MIXTURE OF NITROCHLOROBENZOIC ACID ISOMERS
Edward D. Weil, Lewiston, and Edwin Dorfman, Grand Island, N.Y., assignors to Hooker Chemical Corporation, Niagara Falls, N.Y., a corporation of New York
No Drawing. Filed May 31, 1962, Ser. No. 198,700
8 Claims. (Cl. 260—515)

This invention is concerned with a novel process for the manufacture of valuable herbicides. More specifically, the inventive concept herein resides in the production of valuable herbicides from a mixture of substantially valueless by-product nitrodichlorobenzoic acids, which remain after separation of the commercially valuable 2,5-dichloro-3-nitrobenzoic acid from the crude nitration product of technical 2,5-dichlorobenzoic acid.

It is an object of this invention to provide an economical method for the production of valuable herbicides.

Still another object of this invention is the utilization of substantially valueless by-product nitrodichlorobenzoic acids.

A further object is the production of the most herbicidal trichlorobenzoic acid, namely, 2,3,6-trichlorobenzoic acid in high yields.

These and other objects of the present invention will become more obvious from the consideration of the following detailed specification.

The process of the instant invention comprises chlorinating the mixture of substantially valueless by-product nitrobenzoic acids which remain after separation of the commercially valuable 2,5-dichloro-3-nitrobenzoic acid from the crude nitration product of technical 2,5-chlorobenzoic acid, at a temperature from about 140° C. to 220° C., preferably in the presence of a Lewis acid catalyst.

The trichlorobenzoic acid resulting from this process, especially the 2,3,6-trichlorobenzoic acid and mixtures of the 2,3,6-isomer with other trichloro isomers especially the 2,3,5-trichlorobenzoic acid are valuable herbicides for control of perennial weeds and, in fact, are in commercial use for this and other purposes.

The process of this invention is preferably conducted by introducing gaseous chlorine into a melt of the by-product nitrochlorobenzoic acids. While the reaction will proceed to some degree below 140° C., down to about 100° C., the rate is rather slow below the 140° C. temperature. Temperatures of above 220° may also be utilized but a considerable amount of decarboxylation occurs above this temperature. Therefore, the preferred range is from about 140° C. to 220° C.

Although the reaction proceeds without a catalyst in the 140° to 220° range, it may be accelerated by employing a catalyst of the Lewis acid type. Examples of Lewis acid catalysts will be evident to one skilled in the art, however, a few Lewis acid catalysts follow; for example, $FeCl_3$, $AlCl_3$, $SbCl_3$, $SnCl_4$, $TiCl_4$, $BF_3$, alumina, oleum, and the like.

A particularly effective catalyst is ferric chloride, since it enables a good rate of chlorination without more than a fraction of a percent of catalyst being required. The amount of catalysts will in general be in the range of 0.01 up to about 10 percent by weight. A duration of the reaction will in general be from 1 to about 100 hours, depending upon the temperature and the catalyst, if any, utilized.

Although atmospheric pressure is preferred, super or subatmospheric pressures may be employed.

An advantage of the process of the invention is that it permits the conversion of a herbicidally inferior by-product to a valuable herbicide, which has hitherto been manufactured only by relatively costly multi-step routes.

A further advantage is that the conversion of a nitrobenzoic acid to a chlorobenzoic acid is effected by use of an inexpensive reagent, chlorine, whereas the classical method of effecting this conversion via reduction to the aminobenzoic acid, diazotization of the latter, and treatment of the diazonium salt with cuprous chloride by the Sandmeyer procedure.

Still a further advantage of the process is that the product of the invention is rich in the most herbicidal trichlorobenzoic acid, and 2,3,6-isomer, and also contains substantial amounts of the next most active trichlorobenzoic acid, the 2,3,5-isomer.

The by-product dichloronitrobenzoic acid isomers, which are the starting materials for the process of the invention, arise as the result of the manufacture of 2,5-dichloro-3-nitrobenzoic acid and its reduction product 2,5-dichloro-3-aminobenzoic acid, these last two compounds being excellent selective herbicides. The 2,5-dichloro-3-nitrobenzoic acid is made as follows: technical 2,5-dichlorobenzoic acid, which generally contains from 30 down to a few percent of 2,3- and 3,4-dichlorobenzoic acid isomers, is nitrated. The crude nitration product contains not only the desired 2,5-dichloro-3-nitrobenzoic acid, but also the other two possible mono-nitration isomers of the 2,5-dichlorobenzoic acid, namely, 2,5-dichloro-4-nitrobenzoic acid and 2,5-dichloro-6-nitrobenzoic acid. The crude product can also contain the nitration products of the 2,3- and 3,4-dichlorobenzoic acids which were present in the original dichlorobenzoic acids used in the nitration, such as 2,3-dichloro-4-nitrobenzoic acid, 2,3-dichloro-5-nitrobenzoic acid, 2,3-dichloro-6-nitrobenzoic acid, 3,4-dichloro-2-nitrobenzoic acid, 3,4-dichloro-5-nitrobenzoic acid, and 3,4-dichloro-6-nitrobenzoic acid. By recrystallization or extraction of the mixture from various solvents such as, for example, chlorobenzene, the desired 2,5-dichloro-3-nitrobenzoic acid, which is the relatively less soluble isomer in generally all solvent systems is almost completely separated out, leaving the by-product isomers in solution. These may be isolated by evaporation of the solvent, or by extraction with aqueous base, such as caustic soda, following by acidification to reprecipitate the organic acids. These by-product acids, as might be deduced from what has been said, constitute a complex and virtually inseparable mixture, semi-solid in character, and contain all mono-nitration isomers of 2,5-, 3,4- and 2,3-dichlorobenzoic acids. This mixture, unlike the useful 2,5-dichloro-3-nitro-isomer, is useless as a crop selective herbicide, since it causes severe malformation of crops exposed to it; and, at the same time, it is relatively weak in weed killing ability in general. Consequently, the material represents a nearly valueless by-product which, in fact, presents a disposal problem.

The invention may be better illustrated by a reference to the following examples.

*Example 1*

The crude product of nitration of technical 2,5-dichlorobenzoic acid was recrystallized from o-dichlorobenzene to isolate the herbicidally valuble 2,5-dichloro-3-nitrobenzoic acid in 90% recovery. The mother liquor from the recrystallization was steam distilled until no further orthodichlorobenzene distilled over, leaving a residue of by-product dichloronitrobenzoic acids as a semi-solid mass.

The mixed by-product dichloronitrobenzoic acid (430 parts by weight) was heated to 180° and 3 parts of ferric chloride added. With stirring chlorine gas was bubbled into the mixture. The reaction, once started at 180°, continued even when the temperature was allowed to drop to 140°. The chlorination was continued for 16 days, gradually raising the temperature from 140° to 205°. At this time, infrared analysis showed that the nitro group had substantially vanished.

The crude product was dissolved in benzene-ether mixture, and extracted with dilute aqueous caustic soda. The aqueous extract was acidified with hydrochloric acid and the precipitated acids filtered out. A small additional amount of organic acid was extracted with benzene and, upon evaporation of the benzene, combined with the filter cake. The total recovered acids amounted to 280 parts by weight, and have the correct chlorine analysis for trichlorobenzoic acid. Infrared analysis showed that the product had the following composition:

| | Percent |
|---|---|
| 2,5-dichlorobenzoic acid | 4.2 |
| 2,3,5-trichlorobenzoic acid | 25.7 |
| 2,3,6-trichlorobenzoic acid | 39.7 |
| 2,4,5-trichlorobenzoic acid | 21.8 |
| 2,3,4,5-tetrachlorobenzoic acid | 2.8 |
| 2,3,5,6-tetrachlorobenzoic acid | 3.1 |
| Pentachlorobenzoic acid | 2.8 |

*Example 2*

A chlorination was conducted as in Example 1 but in the temperature range 180–185° throughout. In twenty hours, a product essentially identical to that of Example 1 was obtained.

*Example 3*

A chlorination was conducted as in Example 1 but without the use of ferric chloride and at a temperature of 195–205°. A product essentially identical to that of Example 1 was obtained in 24 hours.

Various changes and modifications may be made in the method and apparatus of this invention, certain preferred forms of which have been herein described, without departing from the spirit and scope of this invention. These modifications of this basic invention are to be regarded as within the scope and purview of this invention.

We claim:

1. A process for the production of trichlorobenzoic acids which comprises reacting elemental chlorine with a mixture of nitrodichlorobenzoic acids resulting from the nitration of crude 2,5-dichlorobenzoic acid to produce an isometric mixture of nitrodichlorobenzoic acids and separating 2,5 - dichloro - 3 - nitrobenzoic acid from the mixed nitrodichlorobenzoic acids, at a temperature in the range of about 140° C. to 220° C.

2. The process of claim 1 wherein a Lewis acid catalyst is employed.

3. The process of claim 2 wherein the catalyst is FeCl$_3$.

4. A process for preparing trichlorobenzoic acid which comprises reacting chlorine with a by-product of nitrodichlorobenzoic acid resulting from the manufacture of 2,5-dichloro-3-nitrobenzoic acid by nitrating crude 2,5-dichlorobenzoic acid to produce a mixture of 2,5-dichloro-3-nitrobenzoic acid, 2,5-dichloro-4-nitrobenzoic acid, 2,5-dichloro-6-nitrobenzoic acid, 2,3- dichloro-4-nitrobenzoic acid, 2,3-dichloro-5-nitrobenzoic acid, 2,3-dichloro-6-nitrobenzoic acid, 3,4-dichloro-2-nitrobenzoic acid, 3,4-dichloro-5-nitrobenzoic acid and 3,4-dichloro-6-nitrobenzoic acid and separating 2,5-dichloro-3-nitrobenzoic acid from the mixed nitrodichlorobenzoic acids, at a temperature above 100 degrees centigrade so that the nitro radicals of the mixed nitrodichlorobenzoic acids are replaced by chlorine.

5. A process for preparing trichlorobenzoic acid according to claim 4 which comprises reacting gaseous chlorine with the nitrodichlorobenzoic acid mixture at a temperature between 140° C. and 220° C., for a time, from 1 to 100 hours, in which the nitro radical is substantially completely replaced by a chlorine atom.

6. A process for preparing trichlorobenzoic acid according to claim 4 which comprises reacting gaseous chlorine with the nitrodichlorobenzoic acid mixture for 1 to 100 hours at a temperature between 140° C. and 220° C. until substantial replacement of the nitro radical by chlorine, dissolving the product in suitable organic solvent, extracting and neutralizing, acidifying the neutralized product and precipitating and separating the product trichlorobenzoic acid.

7. A process according to claim 6 in which a Lewis acid catalyst is employed in the range of 0.01 to 10% by weight of the reaction mixture.

8. A process according to claim 4 in which the reaction is conducted by bubbling chlorine gas for 1 to 100 hours at a temperature of 140° C. to 220° C. through a melt of mixed nitrodichlorobenzoic acids comprising 0.01% to 10% of ferric chloride Lewis acid catalyst until the nitro radical is substantially completely replaced by chlorine to form a trichlorobenzoic acid mixture.

References Cited by the Examiner

Ponomarenko et al.: "Chem. Abstracts," volume 52, page 18325e citing Ukrain Khim. Zhur, 24, 68–72 (1958).

Miller et al.: "J. Org. Chem.," vol. 25, 1960 pages 1249–1250.

LORRAINE A. WEINBERGER, *Primary Examiner.*

CHARLES B. PARKER, *Examiner.*

R. K. JACKSON, T. L. GALLOWAY,
*Assistant Examiners.*

UNITED STATES PATENT OFFICE
CERTIFICATE OF CORRECTION

Patent No. 3,278,591                                         October 11, 1966

Edward D. Weil et al.

It is hereby certified that error appears in the above numbered patent requiring correction and that the said Letters Patent should read as corrected below.

Column 2, line 70, for "days" read -- hours --; column 3, line 44, for "isometric" read -- isomeric --.

Signed and sealed this 24th day of October 1967.

(SEAL)
Attest:

Edward M. Fletcher, Jr.                                        EDWARD J. BRENNER
Attesting Officer                                                  Commissioner of Patents